(12) United States Patent
Koenck et al.

(10) Patent No.: US 7,693,167 B2
(45) Date of Patent: Apr. 6, 2010

(54) MOBILE NODAL BASED COMMUNICATION SYSTEM, METHOD AND APPARATUS

(75) Inventors: Steven E. Koenck, Cedar Rapids, IA (US); Allen P. Mass, Lisbon, IA (US); James A. Marek, Anamosa, IA (US); John K. Gee, Mount Vernon, IA (US); Bruce S. Kloster, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 338 days.

(21) Appl. No.: 11/805,571

(22) Filed: May 22, 2007

(65) Prior Publication Data
US 2009/0225751 A1 Sep. 10, 2009

(51) Int. Cl.
*H04L 12/56* (2006.01)
*H04J 1/16* (2006.01)

(52) U.S. Cl. .................. 370/419; 370/252; 370/389

(58) Field of Classification Search .............. 370/328, 370/329, 386, 471, 238, 252, 419, 389; 709/224
See application file for complete search history.

(56) References Cited

U.S. PATENT DOCUMENTS

| | | | |
|---|---|---|---|
| 4,446,517 A | 5/1984 | Katsura et al. | |
| 5,260,936 A | 11/1993 | Bardet et al. | |
| 5,404,560 A | 4/1995 | Lee et al. | |
| 5,614,948 A | 3/1997 | Hannah | |
| 6,141,740 A | 10/2000 | Mahalingaiah et al. | |
| 6,369,737 B1 | 4/2002 | Yang et al. | |
| 6,538,593 B2 | 3/2003 | Yang et al. | |
| 6,542,981 B1 | 4/2003 | Zaidi et al. | |
| 6,606,704 B1 | 8/2003 | Adiletta et al. | |
| 6,738,884 B1 | 5/2004 | Greicar | |
| 2003/0110367 A1 | 6/2003 | Chin et al. | |
| 2003/0120874 A1 | 6/2003 | Deshpande et al. | |
| 2005/0097306 A1 | 5/2005 | Gajski | 712/245 |
| 2006/0182145 A1* | 8/2006 | Seo et al. | 370/471 |
| 2006/0251092 A1 | 11/2006 | Matterne et al. | |
| 2007/0038743 A1* | 2/2007 | Hellhake et al. | 709/224 |

OTHER PUBLICATIONS

"Intel iAPX 342," from Wikipedia®, Wikipedia Foundation, Inc.; this entry last modified Apr. 11, 2007; http://en.wikipedia.org/wiki/Intel_iAPX_432; May 22, 2007; 5 pages.

"MicroCore a scalable dual Stack, Harvard Processor for embedded Control that fits into FPGAs easily," by Klaus Schleisiek; © Klaus Schleisiek, Apr. 16, 2004, Rev. 1.51; klaus.schleisiek@hamburg.de; 23 pages.

(Continued)

*Primary Examiner*—John Pezzlo
(74) *Attorney, Agent, or Firm*—Matthew J. Evans; Daniel M. Barbieri

(57) ABSTRACT

An improved micro architectural approach for a network microprocessor has low power consumption, and employs two specialized processing cores, a MAC processing core and a network processor core. Each of these processing cores has facilities designed for a specific set of functions, to handle ISO layer 2 and layer 3 functionality in a packet switched Software Defined Radio mobile network.

20 Claims, 7 Drawing Sheets

OTHER PUBLICATIONS

"CMOS/SOS Microprocessor," by David W. Best, et al.; MICRO An Advanced-Architecture Microprocessor, Aug. 1982; © IEEE Computer Society; The Institute of Electrical and Electronics Engineers, Inc.; 18 pages.

U.S. Appl. No. 11/805,510, filed May 22, 2007, Koenck et al.

U.S. Appl. No. 11/805,314, filed May 22, 2007, Koenck et al.

U.S. Appl. No. 12/150,189, filed Apr. 25, 2008, Koenck et al.

Nakamura et al., Recent Progress in CMD Imaging, 1997 IEEE Workshop on Charge-Coupled Devices and Advanced Image Sensors, pp. R14-1 through R14-4.

MicroCore Home Page, This site is the home of the "MicroCore" Project, believed to be available by Jun. 24, 2004, printed from http://www.microcore.org on Sep. 8, 2009, 2 pages.

MicroCore implementation and modularisation, Jun. 24, 2004, printed from website http://www.microcore.org, 6 pages.

Schleisiek, Klaus, "MicroCore, a scalable, dual Stack, Harvard Processor for embedded Control that fits into FPGAs easily," Apr. 16, 2004, printed from website http://www.microcore.org, 23 pages.

Schleisiek, Klaus, "Using MicroCore, Report on a Deeply Satisfying Instantiation," 20$^{th}$ euroForth Conference, Saarland, Germany, Nov. 19-22, 2004, 11 pages.

US Office Action for U.S. Appl. No. 11/805,314 mailed Sep. 24, 2009, 20 pages.

* cited by examiner

MOBILE NODAL BASED COMMUNICATION SYSTEM, METHOD AND APPARATUS

CROSS-REFERENCE TO RELATED APPLICATIONS

This application is filed concurrently with commonly assigned, non-provisional U.S. patent applications U.S. patent application Ser. No. 11/805,510, entitled "ENERGY EFFICIENT PROCESSING DEVICE" listing as inventors Steven E. Koenck, John K. Gee, Jeffrey D. Russell and Allen P. Mass; and, U.S. patent application Ser. No. 11/805,314 "SYSTEM AND METHOD FOR LARGE MICROCODED PROGRAMS" listing as inventors Steven E. Koenck and John K. Gee; all incorporated by reference herein.

BACKGROUND OF THE INVENTION

1. Field of Invention

The present invention relates generally to mobile nodal based networks and more particularly to a mobile nodal based network apparatus having reduced packet forwarding latency, and improved nodal bandwidth, robustness, and power requirements.

2. Description of Related Art

The present invention relates generally to routing packets between computing devices in a network, such as a mesh network and mobile ad-hoc networks (MANet) used for military applications such as software defined radio (SDR) in the Joint Tactical Radio System (JTRS).

A mobile ad-hoc network (MANet) is a self-configuring network of mobile router nodes, e.g. wireless laptop personal computers but including airborne, fixed, maritime, vehicular, dismounted and handheld applications, forming a topology. The router nodes may organize themselves in a peer-to-peer, computer-to-computer manner without the use of a central base station (access point).

A mobile ad-hoc network node does not need a priori knowledge of the topology of the network around the network node. A new node introduced into a MANet can discover the topology by announcing its presence and listening for corresponding announcements from its neighbor nodes. A new node may learn about new near nodes and how to reach them; the new node can announce that it can also reach those nodes. As time progresses each node may know about all other nodes and how to reach them. Nodes may grow into the MANet and withdraw from it.

MANets may be used in radio network systems such as TDRS (Tactical Data Radio System) and JTRS (Joint Tactical Radio System), such as used for software defined radio (SDR). Historically some of the earliest MANets were called "packet radio" networks, sponsored by DARPA in the 1970s.

A radio device that is implemented digitally is broadly composed of two parts: a radio modem and a MAC (Media Access Control) controller, responsible for running the MAC protocol. The MAC sublayer is the part of the OSI or IEEE network model data link layer that determines who is allowed to access the physical media at any one time. It acts as an interface between the Logical Link Control sublayer and the network's physical layer as defined in the OSI or IEEE network model.

A modem is a device for modulating and demodulating a signal that typically has digital information therein, hence the term "modem" for modulator/demodulator. The signal is constructed to be suitable for the relevant transmission medium and is typically transmitted as an analog signal.

Modems have been used to communicate via telephone lines, with an analog carrier signal encoded with digital information, but modems can be used over any medium for transmitting signals, including over-the-air radio waves. Radio waves are generally defined to include the band of radio frequencies in the electromagnetic spectrum from 3 kHz to 300 GHz, from the Extremely Low Frequency (ELF) to Extremely High Frequency (EHF) bands respectively.

Modem is used as a term for "modem control", meaning managed resources for waveform modulation and demodulation schemes of the kind used in radio data transmission, including but not limited to Frequency Modulation (FM), Amplitude Modulation (AM), Single Side Band (SSB), Double Side Band (DSB), Vestigial Sideband (VSB), Frequency Shift Keying (FSK), Phase Shift Keying (PSK), Gaussian Minimum Shift Keying (GMSK), Quadrature Amplitude Modulation (QAM), Frequency Hopped Spread Spectrum (FHSS), Direct Sequence Spread Spectrum (DSSS), Orthogonal Frequency Division Multiplexing (OFDM) and the like.

A software defined radio (or digital radio) is a radio that functions like a computer, where the functionality of the radio is defined by software that can be upgraded, rather than by fixed hardware. SDR has been defined as a radio whose signal processing functionality is defined in software, where the waveforms are generated as sampled digital signals, converted from digital to analog via a high-speed Digital-to-Analog Converter (D/A) and then translated to Radio Frequency (RF) for wireless propagation to a receiver. The receiver typically employs an RF subsystem coupled to a high-speed Analog-to-Digital Converter (A/D) that can capture some or all of the channels of the software radio node. The receiver then extracts and demodulates the channel waveform using software executing on a digital processor. Thus SDR can be reprogrammed to transmit and receive any radio standard, by reprogramming the digital radio with the protocol required, including any arbitrary modulation and bit rate, and with A/D converters operating up to the gigasample per second range to convert analog signals into the digital domain.

SDR is aimed at solving several of the challenges of over-the-air communications, including compatibility with pre-existing legacy radio systems, ability to emulate transmission and reception of a plurality of different waveforms or forms of modulation (modem control), and more efficient spectrum usage, including operation in different frequency bands, with the lowest possibility of interception, detection and interference from unauthorized parties.

The U.S. military through the Department of Defense (DoD) has driven the development of next generation SDR with an Open Standard Architecture for implementing Joint Tactical Radio Systems (JTRS), which is used to communicate in military communication systems, through the use of an open standard Software Communications Architecture (SCA). The SCA calls out the following features: a Common Open Architecture; the ability to support multiple domains, including airborne, fixed, maritime, vehicular, dismounted and handheld applications; the ability to operate in multiple frequency bands; compatibility with legacy radio systems; the ability to easily insert new technologies to improve performance; enhanced security, including cryptographic capability, user identification and authentication, encryption key management, and multiple independent levels of security classification; networking ability, including support for legacy network protocols; software reusability; and support for plug-and-play and real-time reconfigurability, with waveforms being portable from one platform implementation to another. The SCA provides standardization of hardware platforms and waveform application software to enable portability and interoperability over the life cycle of military communication systems Prior art scalable network architectures typically employ multiple distributed processors communicating with each other over an interconnecting network. OSI (Open System Interconnection) is an ISO standard for worldwide communications that defines a framework for implementing protocols in seven hierarchical layers in a network. Control is passed from one layer to the next, starting at the application layer in one station, and proceeding to the bottom layer, over the channel to the next station and back up the hierarchy. Layers in the OSI protocol stack include layer 1, the physical layer (electrical signals); layer 2, the MAC layer (data link, transmits data packets from node to node based on node addresses); layer 3, the network layer (routes data to different LANs/WANs based on network address); layer 4, the transport layer (ensures delivery of entire message or file); layer 5, the session layer (starts, stops session); layer 6, the presentation layer (encryption, data conversion); layer 7, the application layer.

IEEE 802.11 stands for a family of IEEE standards for wireless LANs that were designed to extend 802.3 (wired Ethernet) into the wireless domain. The 802.11 standard is more widely known as "Wi-Fi" because the Wi-Fi Alliance, an organization independent of IEEE, provides certification for products that conform to 802.11. The IEEE 802.11 communication framework is largely similar to the OSI model, but the 802.11 specification for LANs breaks the data link layer into two sublayers: the LLC (Logical Link Control) and MAC (Media Access Control). The LLC provides a common interface to the MAC layers, which specify the access method used.

The MAC sublayer is primarily concerned with the control of access to the physical transmission medium (i.e. which transmitters are transmitting in the physical layer or which node or frequency range has the right to transmit) or low-level media-sharing protocols like CSMA/CD. The upper Data-Link sub-layer, the Logical Link Control (LLC) sub-layer handles such tasks as: recognizing where frames begin and end in the digital bit-stream received from the physical layer when receiving; delimiting the frames when sending, that is, inserting information such as extra bits into or among the frames being sent so that the receiver(s) are able to recognize the beginning and end of the frames; detection of transmission errors such as by inserting a checksum into every frame sent and recalculating and comparing them on the receiver side; inserting the source and destination MAC addresses into every frame transmitted; and filtering out the frames intended for the station by verifying the destination address in the received frames.

The MAC controller can be implemented by a microcontroller on a card, with some functionalities of the MAC in the software drivers on a personal computer, or, for increased performance and greater cost, by an ASIC (Application Specific Integrated Circuit). MAC controllers are concerned with parameters such as the packet format (size, headers) of the packet, the channel access mechanisms and the network management features, as well as the circuitry and on-board memory to perform the functionality of the MAC layer. For performance reasons, MAC protocol functionality is often embedded in the device and only a few non performance critical functions are handled by a software driver on the host. The very low part of the MAC protocol, which is time critical, is implemented in the baseband ASIC of the digital radio. For instance, the carrier sense and MAC acknowledgement need reaction in the order of a dozen microseconds, which argues for using an ASIC.

Wireless mesh networks are rapidly gaining acceptance in both commercial and military applications as a low cost solution for network connectivity. Many of these mesh networks utilize variants of the 802.11 standard, although wireless communication waveforms may be specially designed to more optimally support mesh networking.

A basic characteristic of mesh networks is that there is no fixed or central infrastructure such as a base tower, so each node in the network must provide infrastructure services to the other network nodes. In the case of communication between two relatively distant nodes, each node between the distant nodes must receive packets, determine who to send the packets to, and transmit the packets to the next node. Each link between intermediate nodes is called a "hop", and the performance of the mesh network is determined by the ability of the nodes to perform these hop functions quickly and efficiently. Present wireless mesh networks are implemented using small embedded computing environments such as Linux executing on an Intel XScale microprocessor. The networking functions are typically implemented in software running in the Linux operating environment. Additionally, many important mesh network applications must be powered from batteries, so it is critical that the power consumption of the mesh network infrastructure be low.

This software approach has been useful and effective in proving the feasibility of mesh networking, and relatively small (<100 node) mesh networks have been constructed and fielded using this approach. Experience has shown, however, that as the network traffic begins to increase, the performance of the mesh network begins to degrade, primarily due to the computing overhead associated with each "hop" in the intermediate nodes of the mesh. For real time services such as voice over IP (VoIP), the end-to-end packet deliver latency must be less than about 250 milliseconds (ms). Software implemented mesh networking has been observed to incur packet forwarding delays of up to 25 ms, which limits the network to about 8 hops.

In computer engineering, microarchitecture is the design and layout of a microprocessor, microcontroller, or digital signal processor. Microarchitecture considerations include overall block design, such as the number of execution units, the type of execution units (e.g. floating point, integer, branch prediction), the nature of the pipelining, cache memory design, and peripheral support.

A computer operation is an operation specified by an instruction stored in binary form, in a computer's memory. A control unit in the computer uses the instruction (e.g. operation code, or opcode), decodes the opcode and other bits in the instruction to perform required microoperations. Microoperations are implemented by hardware, often involving combinational circuits. In a CPU, a control unit is said to be hardwired when the control logic expressions are directly implemented with logic gates or in a PLA (programmable logic array). By contrast to this hardware approach for the control logic expressions, a more flexible software approach may be employed where in a microprogrammed control unit, the control signals to be generated at a given time step are stored together in a control word, called a microinstruction. The collection of these microinstructions is called a microprogram, and the microprogram is stored in a memory element termed the control store.

Microprogramming is a systematic technique for implementing the control unit of a computer. Microprogramming is a form of stored-program logic that substitutes for sequentiallogic control circuitry. A central processing unit (CPU) in a computer system is generally composed into a data path unit and a control unit. The data path unit or data path includes registers, function units such as ALUs (arithmetic logic units), shifters, interface units for main memory and I/O, and internal busses. The control unit controls the steps taken by the data path unit during the execution of a machine instruction or macroinstruction (e.g., load, add, store, conditional branch). Each step in the execution of a macroinstruction is a transfer of information within the data path, possibly including the transformation of data, address, or instruction bits by the function units. The transfer is often a register transfer and is accomplished by sending a copy (i.e. gating out) of register contents onto internal processor busses, selecting the operation of ALUs, shifters, and the like, and receiving (i.e., gating in) new values for registers. Control signals consist of enabling signals to gates that control sending or receiving of data at the registers, termed control points, and operation selection signals. The control signals identify the microoperations required for each register transfer and are supplied by the control unit. A complete macroinstruction is executed by generating an appropriately timed sequence of groups of control signals; with the execution termed the microoperation.

What is needed and not found in the prior art is a system and method to successfully scale a mesh network that provides VoIP services, and to significantly reduce the latency associated with packet forwarding.

SUMMARY OF THE INVENTION

Accordingly, an aspect of the present invention is to address the critical aspects of mesh networks and to provide a number of performance enhancements.

To this end, an interface controller of the present invention may provide several key functions:

(i) Interface to RF communication subsystem (ISO Layer 1);

(ii) Implementation of communication modem (ISO Layer 1);

(iii) Implementation of network media access controller (MAC) (ISO Layer 2);

(iv) Accelerated packet forwarding (lower portions of ISO Layer 3);

(v) Interface to host processor (upper portions of ISO Layer 3, rest of ISO stack).

The interface controller may be implemented as an Application Specific Integrated Circuit (ASIC) device comprised of a set of programmable building blocks. The key building blocks are termed cores—small microcoded computing modules that can be loaded with programs that implement the desired computing behavior. The initial interface controller architecture has been conceived with two basic core types: a MAC core and a Network Processor core. Each of these cores has facilities designed for a specific set of functions.

The MAC core has a microsequencer coupled with an 8 bit data manipulation subsystem that is optimized for handling octets of data from the Layer 1 interface. The MAC core microcode implements the ISO Layer 2 MAC functionality.

The Network Processor core has a microsequencer coupled to a somewhat more complex 8 bit data manipulation subsystem optimized for performing network routing functions (the lower portions of ISO Layer 3). A fast memory content search is implemented with a subsystem of a RAM, hardware address counter, and hardware data comparator, so network addresses can be searched linearly at core speeds. This approach is slower than typical Internet routers, but is also much smaller, consumes lower power, better supports an unordered dynamic list, and is sufficiently fast for effective routing to up to about 10,000 nodes or more.

The interface controller forwards network packets to the proper next physical destination very quickly to minimize accumulation of data latency. This forwarding operation is performed primarily by the Network Processor core, which analyzes the IP Destination Address in each packet and looks up in its routing table the physical (MAC) address that the packet should be sent to next. Maintenance of the routing table is an upper Layer 3 function that will be performed by the host processor. It is anticipated that the basic packet forwarding operation will be performed in less than 2 ms average, which makes it possible for packets to forward up to 100 hops end-to-end. This could enable VoIP services on mesh networks for up to 10,000 nodes or more.

A beneficial feature of the core implemented packet forwarding system is the fact that the host processor is not involved in the majority of the operation of the network infrastructure, and may therefore remain in an idle or sleeping condition most of the time. This makes it possible to save a substantial amount of battery power while providing very high packet forwarding performance.

The architecture of the present invention, though preferably an ASIC device comprised of a set of programmable building blocks, can be implemented in any combination of hardware and/or software as a Programmable Logic Device (PLD).

The sum total of all of the above advantages, as well as the numerous other advantages disclosed and inherent from the invention described herein, creates an improvement over prior techniques.

The above described and many other features and attendant advantages of the present invention will become apparent from a consideration of the following detailed description when considered in conjunction with the accompanying drawings.

BRIEF DESCRIPTION OF THE DRAWINGS

Detailed description of preferred embodiments of the invention will be made with reference to the accompanying drawings. Disclosed herein is a detailed description of the best presently known mode of carrying out the invention. This description is not to be taken in a limiting sense, but is made merely for the purpose of illustrating the general principles of the invention. The section titles and overall organization of the present detailed description are for the purpose of convenience only and are not intended to limit the present invention.

Figure 1:
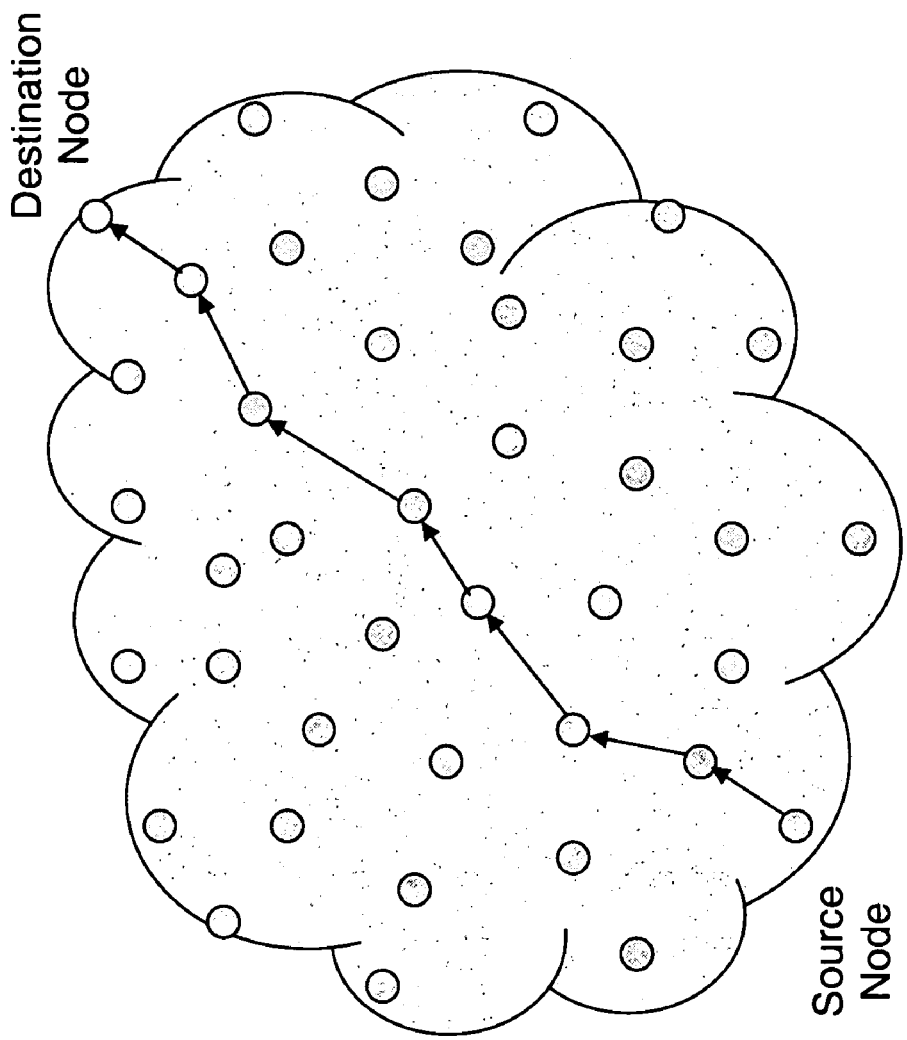
FIG. 1 is a schematic of a typical mesh network topology in a SDR network.

It should be understood that one skilled in the art may, using the teachings of the present invention, vary embodiments shown in the drawings without departing from the spirit of the invention herein. In the figures, elements with like numbered reference numbers in different figures indicate the presence of previously defined identical elements.

DETAILED DESCRIPTION OF THE INVENTION

FIG. 1 is a schematic of a mesh network topology in a SDR nodal network in accordance with an embodiment of the present invention. These elements include a plurality of nodes, each node acting as a transmitter and receiver, in a packet switching network forming a MANet, with the nodes following a communications protocol such as the OSI (ISO) or IEEE model, such as IEEE 802.11 or equivalent. In exemplary embodiments, the communications protocol is represented as an abstract model, which has a number of layers. The abstract model of the communications protocol includes a physical layer for converting data between a signal transmitted across the nodal network and a bitwise representation of the signal within the node. For example, in one specific embodiment, in which the nodal network implements the OSI communications protocol, the physical layer corresponds to Layer 1 of the abstract OSI seven-layer model. The abstract model of the communications protocol also includes a data link layer for arranging the bits of the signal into logical data, which would correspond to Layer 2 of the OSI seven-layer model in an OSI communications protocol implementation. The data link layer includes a data communication protocol sub-layer, such as the Media Access Control (MAC) Layer in the seven-layer OSI model. Further, the abstract model of the communications protocol includes a network layer for performing network routing of the signal between nodes in the nodal network, which would correspond to Layer 3 of the OSI abstract seven-layer model in an OSI communications protocol implementation. The nodes each have a network processor, preferably an ASIC device formed from a set of programmable building blocks comprising cores of the present invention. The cores comprise a first MAC core and a second Network Processor core, as further taught herein. The cores are fast, scalable, programmable and consume low power.

The network may employ hop-by-hop (HBH) processing to provide end-to-end reliability with fewer end-to-end transmissions. A hop is a transmission path between two nodes. Network coding (described herein) further reduces end-to-end transmissions for multicast and multi-hop traffic. Each of the nodes has a plurality of input and output ports that may perform multiplexing by time division and/or space division, but preferably TDMA. The switches may operate in a "pass-through" mode, where routing information contained in the packet header is analyzed, and upon determination of the routing path through the switch element, the packet is routed to the appropriate switch port with minimum delay. Alternatively, the switches may operate in a store-and-forward mode with suitable buffers to store message cells or packets of data. The packets have a header, trailer and payload, as explained further herein. The switched fabric network preferably uses a "wormhole" router approach, whereby the router examines the destination field in the packet header. Wormhole routing is a system of simple routing in computer networking based on known fixed links, typically with a short address. Upon recognition of the destination, validation of a header checksum, and verification that the route is allowed for network security, the packet is immediately switched to an output port with minimum time delay. Wormhole routing is similar to Asynchronous Transfer Mode (ATM) or Multi-Protocol Label Switching (MPLS) forwarding, with the exception that the message does not have to be queued.

The network transport protocol may provide "best effort" delivery service of packets through the network, which may be sufficient for packet voice communication modes. The network transport protocol may alternatively provide reliable delivery by the use of an ACK/NAK response to the source from the destination. If an acknowledgement is not received within a specified time period, the transmission will be considered faulty and retransmission of the packet will be initiated by the source. Simultaneous attempts to transmit on a single switched fabric output port will result in a successful transmission for the first requestor, and blocked transmission for any subsequent requesters. The blocked transmissions will fail, resulting in a timeout indication. Furthermore, while it is not seen as necessary for sufficient network performance, it would be possible to provide buffering at each of the outgoing ports of the router with a relatively small buffer memory that could be used to store a blocked packet and transmit it immediately upon completion of the blocking transmission.

Figure 2:
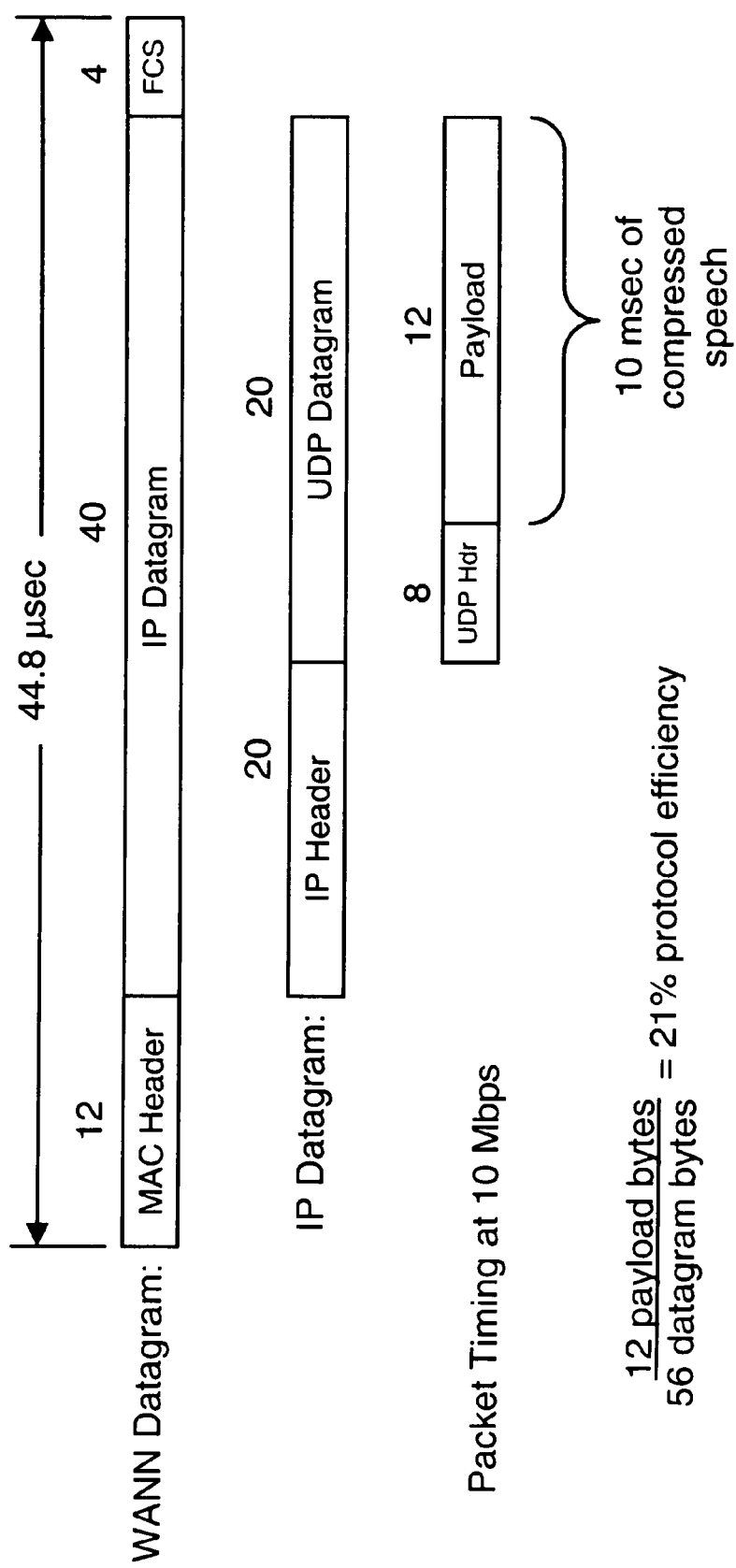
FIG. 2 is the network packet format for a packet transmitted in a SDR network according to the teachings of the present invention.

FIG. 2 describes an example packet format for a switched fabric network of the present invention that is particularly directed toward digital voice transmission in a networked environment, although the present invention is fully capable of general network data transmission. The data packet for the network of the present invention, which could be of any length, is by way of example 56 bytes, and would take preferably 44.8 μsec or less to transmit at a data rate of nominally 10 Mbps, which is typical for short range wireless data links. The data packet has a payload labeled in FIG. 2 as "IP Datagram". The IP Datagram, 40 bytes long, in turn comprises an IP header of 20 bytes, and a UDP Datagram of 20 bytes. The UDP Datagram in turn comprises 12 bytes of payload, typically comprising 10 msec of compressed speech, and UDP header of 8 bytes. Twelve payload bytes divided by 56 datagram bytes gives a 21% protocol efficiency. The header of the entire data packet is 8 bytes, comprising a 4 byte Sync portion for synchronization functions, a 1 byte Control portion for control functions, a 1 byte Source portion, a 1 byte Destination portion, and a 1 byte Checksum portion. These 12 bytes form the "MAC header". The data packet has a trailing 4 byte frame check sequence field for error checking, such as by Cyclic Redundancy Check (CRC), labeled "FCS". Packet routing is accomplished in each switched fabric element by receiving the packet header, computing a header checksum based on the received header information, and verifying that it matches the received header checksum, examining the destination portion to determine where the packet should be routed, and retrieving information from a locally stored routing table indicating the output port to which the packet should be connected to be propagated toward its destination node.

Figure 3:
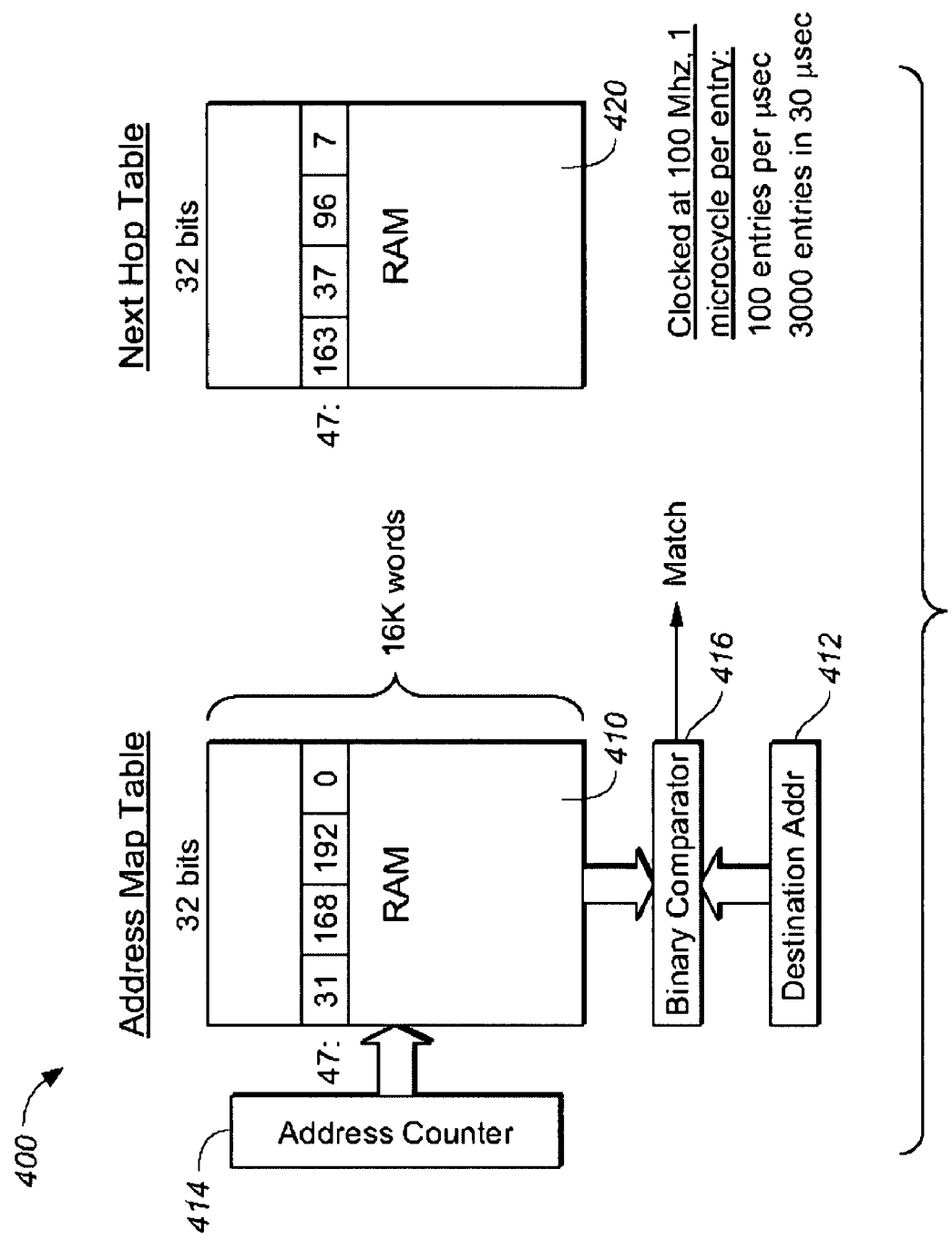
FIG. 3 is a schematic of an address search microarchitecture for the present invention.

FIG. 3 shows an address search microarchitecture 400 for a packet switched network of the present invention. In FIG. 3, a RAM memory 410 receives input search data, in the form of a word, from a register labeled Destination Addr. In FIG. 3, and this word is compared, bit by bit, against stored data held in the RAM, with the address of any matching data returned after one or more clock cycles by the Address Counter 414, and stored in the register 416 labeled Binary Comparator. The address of the matching entry from the Address Map Table of RAM 410 is then matched with corresponding entry (at least one) from a "Next Hop Table", RAM 420, which is the next best hop node data packet forwarding. Typically the Address Search microarchitecture of FIG. 3 operates at a clock speed of 100 MHz, with 1 microcycle per entry, and 100 entries per μsec (μs).

In terms of latency of transmission of data packets in an exemplary embodiment of the present invention, with a packet length of 56 bytes and some inter-packet gap, the total time to transmit a packet will be on the order of 50 μsec (microseconds). Mesh network routing at each node involves identifying the IP address for which the packet is destined, and determining the physical (MAC) address that each packet should be forwarded toward. Assuming a MAC and IP header combined length of 32 bytes, a total of about 26 μsec is needed to receive and identify the IP address. Forwarding to the correct MAC address requires a search of the routing table to associate the destination IP address with the best known route to that destination. A "brute force" approach may be used, in which the destination address is loaded into the address search comparator, and the search memory counts sequentially until a match is discovered. In the case of a typical search memory with 3,000 entries, this would take an average of 50%, or 1500 searches at 0.01 μsec each, for a total of 15 μsec. While this approach could be used for every packet forward operation, a relatively simple process of reordering the contents of the search memory and its associated MAC lookup table could place a recently matched search near the front of the forwarding search memory, so the search would be completed much more quickly; typically less than 1 μsec.

Concerning the packet latency accumulation of the present invention, the entire packet might have a latency of 250 ms, with the Accumulate Voice Segment (an audio/voice containing packet, packet or group of packets) having 10 ms latency, the Vocode segment (an audio codec specialized for human sound) 96 bits long, 10 ms latency, the De-jitter buffer segment (for reducing jitter) having 15 ms latency and the Decode segment (for decoding) having 5 ms latency.

In a preferred embodiment of the present invention, TDMA (Time Division Multiple Access) slot timing may utilize (by way of example only) 100 μs slots. Each such slot may carry up to a 64 byte payload. Given an average slot latency is equal to approximately 800 μsec in a 1600 μsec 16 slot TDMA epoch, and "first route" latency is the sum of average slot latency and first route lookup latency (800+15=815 μs) then worst case slot latency would be approximately 1600 μs and worst case "first route" latency would be approximately 1630 μs in an approximately 3000 node mesh. Bandwidth is also markedly improved, for example:

Assume 10 Mbps data rate, 100 μsec slots, 16 slots/epoch 12 byte payloads: 12 bytes/1600 μsec=60 kbps per slot (=6 VoIP streams)

64 byte payloads: 64 bytes/1600 μsec=320 kbps per slot (IP data mode)

Total available VoIP bandwidth per channel:

16 slots×60 kbps/slot=960 kbps (=96 VoIP streams)

Total available VoIP bandwidth per node:

4 channels/node×960 kbps/channel=3,840 kbps/node (=384 VoIP streams)

Total available IP bandwidth per channel:

16 slots×320 kbps/slot=5,120 kbps

Total available IP bandwidth per node:

4 channels/node×5,120 kbps/channel=20,480 kbps/node

Figure 4:
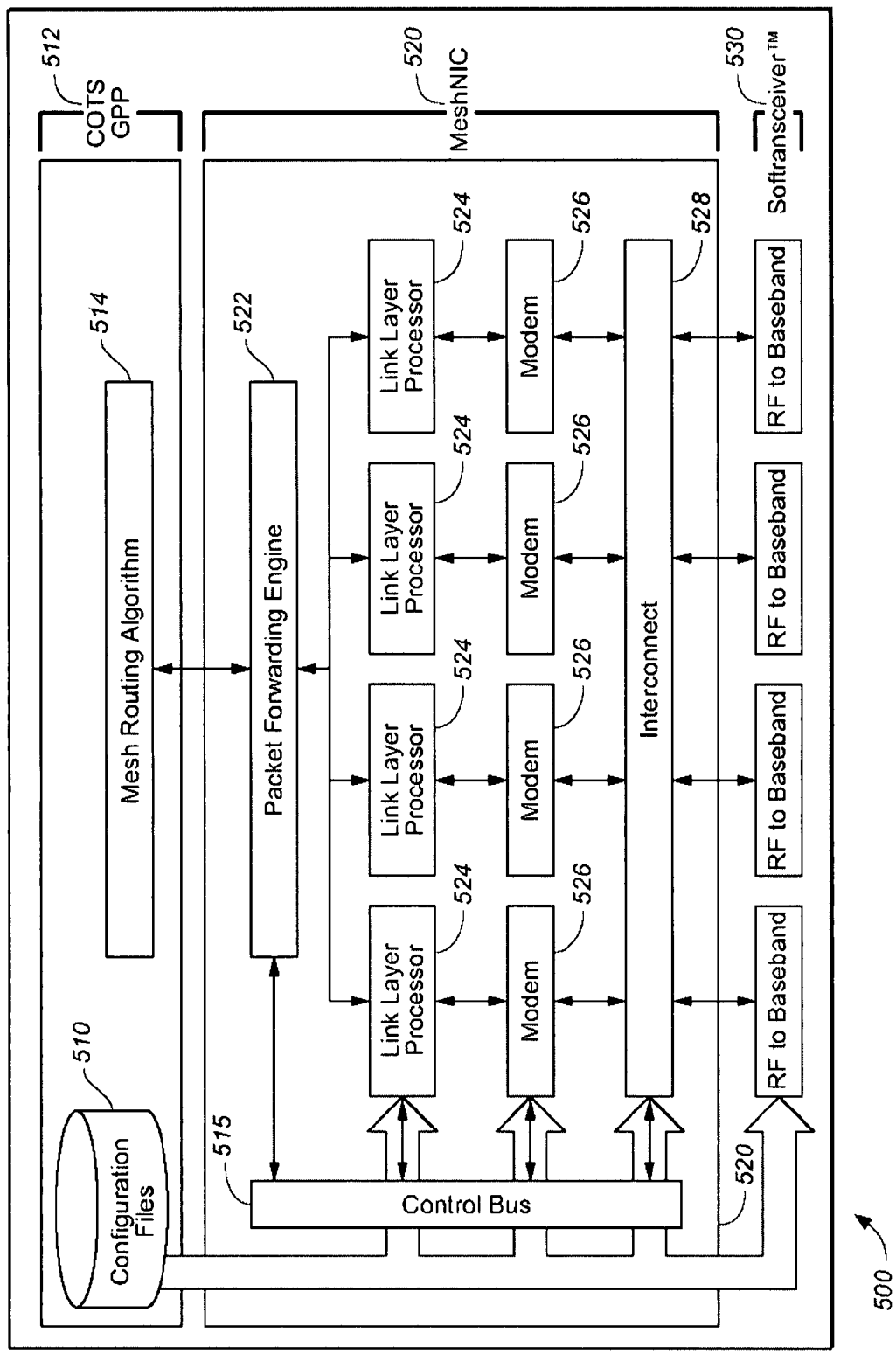
FIG. 4 is a block diagram of the mesh network interface controller when used in a SDR node according to the teachings of the present invention.

Referring to FIG. 4, there is shown a block diagram of the mesh network interface controller 500 when used in a SDR node according to the teachings of the present invention. Each SDR node may include a very high speed Commercial Off The Shelf (COTS) general purpose processor (GPP) microprocessor for the mesh routing algorithm portion of the node. Configuration files from persistent memory 510 may be supplied to all blocks through a control bus 515. The interface controller, as described herein, runs the Packet Forwarding Engine 522, which communicates with lower levels such as the Link Layer processor blocks, which have a Link Layer processor as described further herein. The link layer blocks 524 in turn communicate with lower levels such as the modem blocks 526 and the interconnect to the physical layer through an interconnect 528. The modem blocks 526 have digital components such as radio modems that modulate the data onto frequencies, and A/D converters and the like. These portions may be implemented in hardware, software or a combination of hardware and software known in the art of wireless communication. Modulation for SDR may be done by circuitry such as a: upconverter/downconverter, mixer, reference oscillator, Phase Locked Loop (PLL), heterodyne circuit, matched filter, amplifier and the like typically used in SDR radio. The kind of modulation performed by the modem includes but is not limited to managing resources for waveform modulation and demodulation schemes of the kind used in radio transmission, e.g., Frequency Modulation (FM), Amplitude Modulation (AM), Single Side Band (SSB), Double Side Band (DSB), Vestigial Sideband (VSB), Frequency Shift Keying (FSK), Phase Shift Keying (PSK), Gaussian Minimum Shift Keying (GMSK), Quadrature Amplitude Modulation (QAM), Frequency Hopped Spread Spectrum (FHSS), Direct Sequence Spread Spectrum (DSSS), Orthogonal Frequency Division Multiplexing (OFDM) and the like.

Figure 5:
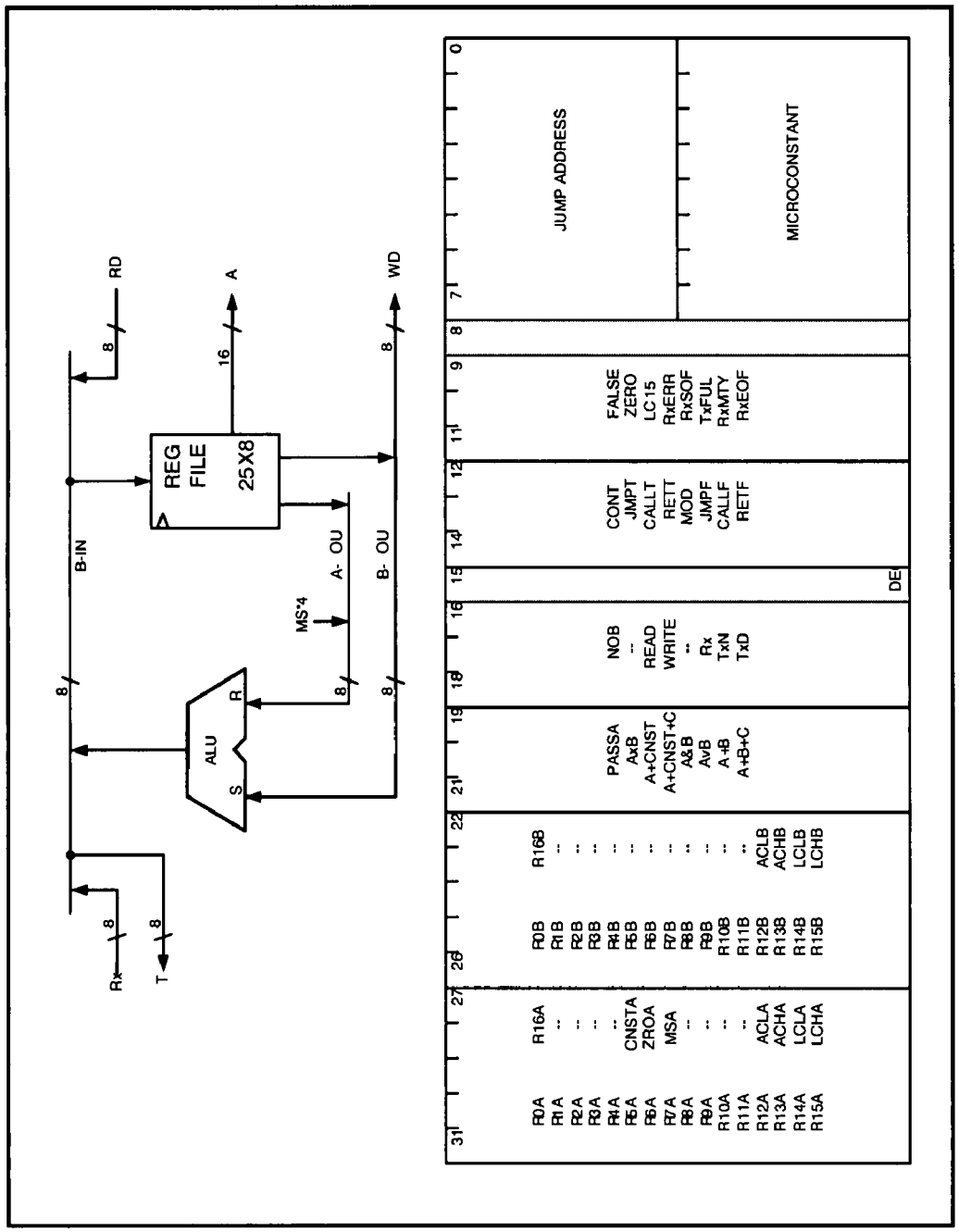
FIG. 5 is a schematic of the link layer core computing module according to the present invention.

Turning attention now to FIG. 5 there is shown a schematic of the link layer core computing module according to the present invention. The link layer core is a special purpose ASIC that acts as a MAC controller and has a microsequencer coupled with an 8 bit data manipulation subsystem that is optimized for handling octets of data from the physical layer (layer 1) interface. The microcode of the MAC link layer core implements ISO layer 2 MAC functionality. Thus in FIG. 5 an ALU receives as inputs, for example, 25 by 8 bit data outputs of a register file (REG FILE). Signal lines Rx and Tx designate receiving and transmitting lines, B-IN designated input is fed into the register file REG FILE, B-OUT is output from the register; A-OUT and B-OUT are input to the ALU, line RD is read data; and line WD is write data. A single memory, which may be two or more separate memories, is partitioned into program memory (which may be loaded from permanent memory such as ROM), which holds a microprogram of macroinstructions and data memory (such as RAM), for holding data. The memory preferably is designed to hold 32 bit words. Each word comprises data with bits reserved for addresses and instructions (control bits). For example, bits 0-7 are reserved for JUMP ADDRESS(ES) and MICRO-CONSTANT(S) (FCS or header data); bit 8 in this example is reserved (unused); bits 9-11 may carry messages, processing or forwarding instructions as fully decoded microcode with or without opcode such as, by way of illustration and not limitation, FALSE, ZERO, LC15, RxERR, RxSOF, TxFUL, RxMTY, RxEOF. It is further contemplated, by way of an example of a preferred embodiment, that bits 12-14 may include instructions such as CONT, JMPT, CALLT, MOD, JMPF, CALLF, RETF; likewise, bits 22-26 and 27-31 may act as address registers such as R0A-R16A, R0B-R16B, and others as shown.

A microsequence controller (not illustrated) controls the sequence of microinstructions and ALU operations. An important feature of the link layer MAC core computing module of FIG. 5 is that it is preferably an ASIC (either PLA or programmable) with both general and standardized and specialized MAC features hardwired as microoperations, rather than software coded as macroinstructions in an instruction set that requires decoding. This substantially reduces the power consumption and latency of program execution, since the need to decode software defined instructions is reduced.

Figure 6:
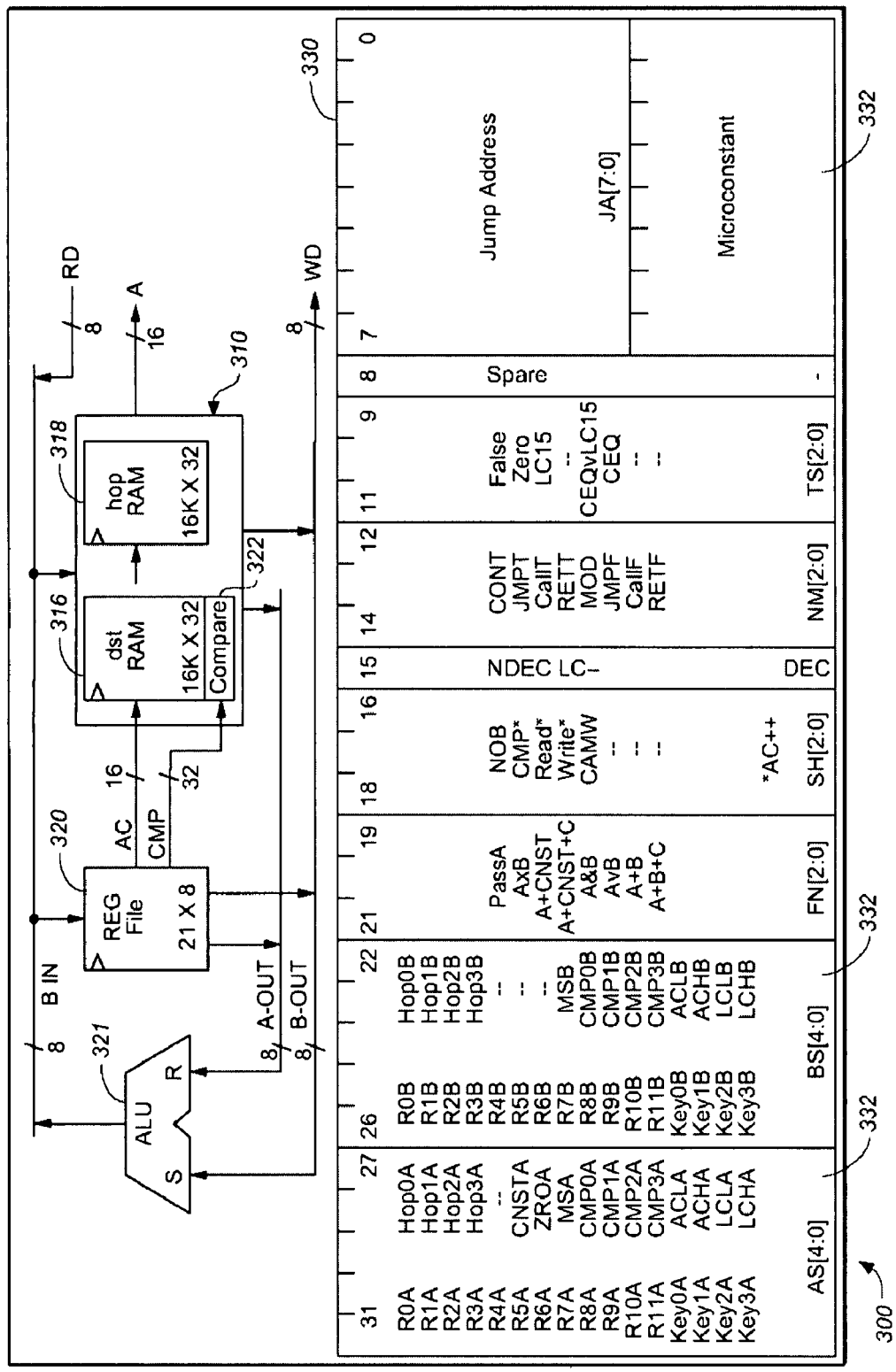
FIG. 6 is a schematic of the network processing core computing module according to the present invention.

Turning attention to FIG. 6, there is shown another dedicated ASIC 300 that is the Network Processor core for performing network routing functions, the lower portions of ISO layer 3. The Network Processor core has a microsequencer coupled to a somewhat more complex 8 bit data manipulation subsystem. A fast memory content search 310 is implemented with a subsystem of a RAM, a hardware address counter, and a hardware data comparator, so that network addresses may be searched linearly at core speeds. The present invention provides increased node density with robust and rich interconnect fabric for both VoIP and data in a small low power requirement form factor.

An address searchable microarchitecture (FIG. 6) "dst" RAM 316, 318 (for destination address map table) and "hop" (for the next hop table) operates similarly to the address search microarchitecture (FIG. 3). A register 320 REG FILE under the control of ALU 321 feeds into the RAM's search data, in the form of a word, and the word is compared against stored data held in the RAM, with the address of any matching data returned after one or more clock cycles, and then preferably stored in a "Compare" register 322. The address of the matching entry from the "dst" RAM 316 is then matched with the corresponding entry from the "hop" RAM 318, which indicates the next best hop node to forward the data packet. Once the address in "dst" RAM 316 is identified, it may be beneficial to move that address and its corresponding best hop information to an address in the "dst" RAM 316 that will be searched more quickly during subsequent packet routing operations.

Figure 7:
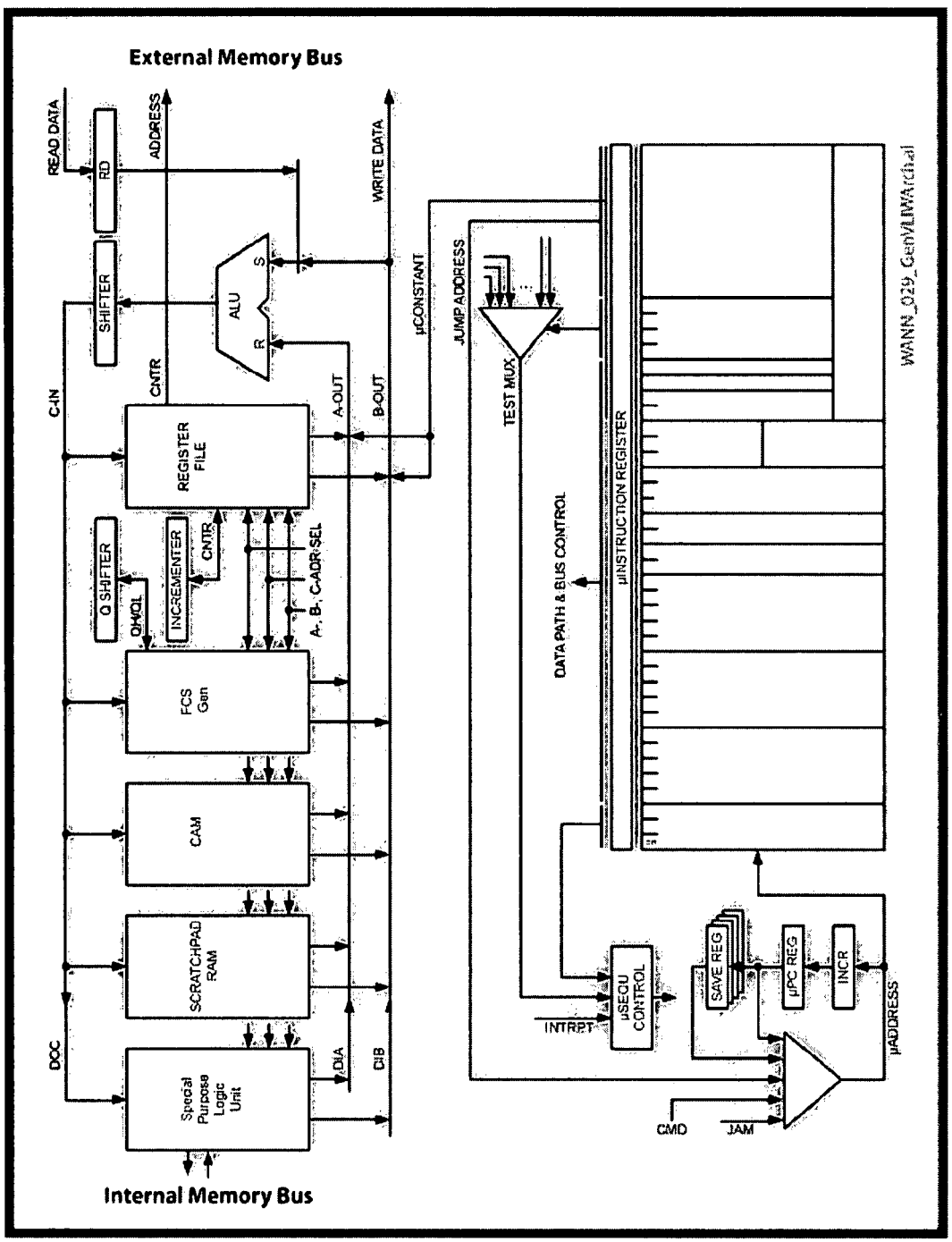
FIG. 7 is a schematic of a general microcoded network processor for the present invention.

Turning attention to FIG. 7, there is shown an ASIC that is termed a General Microcoded Network Processor because it combines the functionality of the ASICs of FIG. 5 and FIG. 6, thus combining the Link Layer core and the Network Processor core into a single ASIC.

As illustrated in FIG. 7, there is shown a "Special Purpose Logic Unit" which may be included for operable network control in a secure or special nodal environment. Likewise, "Scratchpad RAM" may be included for further latency reduction and network robustness. The invention also contemplates the use of a conventional or specialized CAM for optimizing network communication protocol and registers. FCS (frame check sequence) cyclic redundancy check generation logic may also be provided.

It is intended that the scope of the present invention extends to all such modifications and/or additions and that the scope of the present invention is limited solely by the claims set forth below.

The invention claimed is:

1. An interface controller for a first node for connecting to a nodal network, the first node having a routing table identifying a second node in the nodal network, the first node following a communications protocol represented as an abstract model comprising a plurality of layers including a physical layer for converting data between a signal transmitted across the nodal network and a bitwise representation of the signal within the first node, and a data link layer for arranging the bits of the signal into logical data, wherein the plurality of layers includes a network layer for performing network routing of the signal between the first node and the second node in the nodal network, the interface controller comprising:
   a physical layer interface for implementing the physical layer; and
   a first processing core coupled with the physical layer interface, the processing core implementing functionality of the data link layer,
   wherein the first processing core implements the data link layer functionality utilizing microoperations in the first processing core, and the interface controller further comprises a second processing core for implementing network routing functions of the network layer, the second processing core having a core speed and accessing a RAM subsystem, a hardware address counter, and a hardware data comparator allowing the second processing core to search the routing table for a network address for the second node linearly at the core speed.

2. The interface controller as claimed in claim 1, wherein the interface controller is suitable to be held in the hand of a user.

3. The interface controller as claimed in claim 1, wherein the nodal network comprise a mobile ad-hoc network.

4. The interface controller as claimed in claim 3, wherein the interface controller is suitable to be held in the hand of a user.

5. The interface controller as claimed in claim 1, wherein the physical layer interface communicates with the nodal network via Software Defined Radio (SDR).

6. The interface controller as claimed in claim 1, wherein the bitwise representation of the signal within the first node comprises a data packet having a packet header including a destination field, and the nodal network utilizes at least one of wormhole routing, Asynchronous Transfer Mode (ATM) forwarding, and Multi-Protocol Label Switching (MPLS) forwarding.

7. The interface controller as claimed in claim 1, wherein the nodal network is utilized for transmitting Voice over IP (VoIP) data between the first node and the second node.

8. An interface controller for a first node for connecting to a nodal network, the first node having a routing table identifying a second node in the nodal network, the first node following a communications protocol represented as an abstract model comprising a plurality of layers including a physical layer for converting data between a signal transmitted across the nodal network and a bitwise representation of the signal within the first node, a data link layer for arranging the bits of the signal into logical data, and a network layer for performing network routing of the signal between the first node and the second node in the nodal network, the interface controller comprising:
   a physical layer interface for implementing the physical layer;
   a first processing core coupled with the physical layer interface, the first processing core for implementing functionality of the data link layer; and
   a second processing core for implementing the network routing functions of the network layer, the second processing core having a core speed and accessing a RAM subsystem, a hardware address counter, and a hardware data comparator;
   wherein the RAM subsystem, the hardware address counter, and the hardware data comparator allow the second processing core to search the routing table for a network address for the second node linearly at the core speed.

9. The interface controller as claimed in claim 8, wherein the first processing core implements the data link layer functionality utilizing microoperations in the first processing core.

10. The interface controller as claimed in claim 8, wherein the interface controller is suitable to be held in the hand of a user.

11. The interface controller as claimed in claim 8, wherein the nodal network comprises a mobile ad-hoc network.

12. The interface controller as claimed in claim 8, wherein the physical layer interface communicates with the nodal network via Software Defined Radio (SDR).

13. The interface controller as claimed in claim 8, wherein the bitwise representation of the signal within the first node comprises a data packet having a packet header including a destination field, and the nodal network utilizes at least one of wormhole routing, Asynchronous Transfer Mode (ATM) forwarding, and Multi-Protocol Label Switching (MPLS) forwarding.

14. The interface controller as claimed in claim 8, wherein the first processing core and the second processing core are included on a single ASIC.

15. A system for transmitting and receiving signals across a nodal network, comprising:

a communications protocol represented as an abstract model comprising a plurality of layers including a physical layer for converting data between a signal transmitted across the nodal network and a bitwise representation of the signal within a first node, a data link layer for arranging the bits of the signal into the logical data, and a network layer for performing network routing of the signal between the first node and a second node in the nodal network; and an interface controller for the first node for connecting to the nodal network, the node having a routing table identifying the second node in the nodal network, the interface controller comprising a physical layer interface for implementing the physical layer; a first processing core coupled with the physical layer interface, the first processing core for implementing functionality of the data link layer utilizing microoperations wired in the first processing core; and a second processing core for implementing the network routing functions of the network layer, the second processing core having a core speed and accessing a RAM subsystem, a hardware address counter, and a hardware data comparator; the RAM subsystem, the hardware address counter, and the hardware data comparator allowing the second processing core to search the routing table for a network address for the second node linearly at the core speed.

16. The system as claimed in claim 15, wherein the interface controller is suitable to be held in the hand of a user.

17. The system as claimed in claim 15, wherein the nodal network comprises a mobile ad-hoc network.

18. The system as claimed in claim 15, wherein the physical layer interface communicates with the nodal network via Software Defined Radio (SDR).

19. The system as claimed in claim 15, wherein the bitwise representation of the signal within the node comprises a data packet having a packet header including a destination field, and the nodal network utilizes at least one of wormhole routing, Asynchronous Transfer Mode (ATM) forwarding, and Multi-Protocol Label Switching (MPLS) forwarding.

20. The system as claimed in claim 15, wherein the first processing core and the second processing core are included on a single ASIC.

\* \* \* \* \*